(12) United States Patent
Wheeler et al.

(10) Patent No.: US 7,506,447 B2
(45) Date of Patent: Mar. 24, 2009

(54) RECIPROCATING SAW

(75) Inventors: Thomas J Wheeler, Pomona, CA (US); Terry L Turner, Westminster, MD (US); William G Harman, Jr., Glen Rock, PA (US); Earl Kelican, New Oxford, PA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/761,031

(22) Filed: Jan. 20, 2004

(65) Prior Publication Data

US 2004/0143976 A1 Jul. 29, 2004

Related U.S. Application Data

(63) Continuation of application No. 10/038,328, filed on Jan. 2, 2002, now abandoned.

(51) Int. Cl.
 *B23D 49/00* (2006.01)
(52) U.S. Cl. .......................................... 30/392; 30/394
(58) Field of Classification Search .................. 30/123, 30/123.3, 273, 371, 374–376, 392–394; 83/699.21
See application file for complete search history.

(56) References Cited

U.S. PATENT DOCUMENTS

| | | | | |
|---|---|---|---|---|
| 2,627,882 | A | 2/1953 | Kleinsmith | 30/392 |
| 2,902,067 | A | 9/1959 | Oakley | 30/392 |
| 3,170,496 | A | 2/1965 | Kohler et al. | 30/392 |
| 3,204,470 | A | 9/1965 | Brucker | 30/392 |
| 3,478,786 | A | 11/1969 | Hendrickson | 30/376 |
| 3,695,344 | A | 10/1972 | Schnizler, Jr. | 30/392 |
| 3,832,772 | A | 9/1974 | Sumida | 30/392 |
| 4,020,555 | A | 5/1977 | Hedrick | 30/392 |
| 4,031,763 | A * | 6/1977 | Eisenberg | 74/50 |
| 4,083,112 | A | 4/1978 | Palm | 30/392 |
| 4,137,632 | A * | 2/1979 | Pfanzer | 30/393 |
| 4,458,421 | A * | 7/1984 | Lew | 30/369 |
| 4,628,605 | A | 12/1986 | Clowers | 30/393 |
| 4,676,001 | A | 6/1987 | Wagner | 30/393 |
| 4,730,397 | A | 3/1988 | Weiford et al. | 30/392 |
| 5,012,583 | A | 5/1991 | Blochle et al. | 30/392 |
| 5,103,565 | A * | 4/1992 | Holzer, Jr. | 30/392 |
| 5,193,281 | A * | 3/1993 | Kasten | 30/394 |
| 5,199,174 | A * | 4/1993 | Wild | 30/123.3 |
| 5,212,887 | A | 5/1993 | Farmerie | 30/392 |

(Continued)

FOREIGN PATENT DOCUMENTS

CA 483135 5/1952

(Continued)

*Primary Examiner*—Jason Daniel Prone
(74) *Attorney, Agent, or Firm*—Harness, Dickey & Pierce, P.L.C.

(57) ABSTRACT

A reciprocating saw includes a carrier operable to cooperate with a motor to translate rotational movement of the motor into reciprocal linear actuation of a saw blade. A carrier is slidably disposed within the housing and includes a first portion adapted to receive a saw blade and a second portion having a slot therethrough. A rotatable element is fixed for rotation about an output shaft of the motor. A follower operably interconnects the carrier and the rotatable element wherein rotation of the rotatable element provides reciprocal linear motion of the carrier whereby the follower follows a reciprocal linear path within the slot.

16 Claims, 7 Drawing Sheets

U.S. PATENT DOCUMENTS

| | | | |
|---|---|---|---|
| 5,267,498 A | 12/1993 | Miyamoto et al. | 83/781 |
| 5,398,414 A * | 3/1995 | Neubert et al. | 30/392 |
| 5,421,091 A | 6/1995 | Gerritsen, Jr. | 30/392 |
| 5,479,709 A * | 1/1996 | Lai | 30/123.3 |
| 5,535,520 A * | 7/1996 | Armstrong | 30/375 |
| 5,566,768 A * | 10/1996 | Bourke | 30/392 |
| 5,575,071 A | 11/1996 | Phillips et al. | 30/392 |
| 5,778,538 A | 7/1998 | Gentinetta et al. | 30/392 |
| 5,987,758 A | 11/1999 | McCurry et al. | 30/392 |
| 6,112,420 A * | 9/2000 | Schickerling | 30/392 |
| 6,230,411 B1 | 5/2001 | Wall et al. | 30/376 |
| 6,272,757 B1 | 8/2001 | Roe | 30/392 |
| 6,553,675 B2 * | 4/2003 | Orrico | 30/376 |
| 6,662,698 B2 * | 12/2003 | Wheeler et al. | 83/699.21 |
| 6,694,625 B1 * | 2/2004 | Wright | 30/392 |
| 6,920,695 B2 * | 7/2005 | Zeiter et al. | 30/392 |
| 7,131,206 B2 * | 11/2006 | Wu | 30/392 |
| 7,257,900 B2 * | 8/2007 | Wheeler et al. | 30/392 |
| 7,350,302 B2 * | 4/2008 | Imai et al. | 30/393 |
| 2002/0112582 A1* | 8/2002 | Young | 83/167 |
| 2003/0070307 A1* | 4/2003 | Walker | 30/374 |
| 2003/0121387 A1* | 7/2003 | Wheeler et al. | 83/699.21 |
| 2003/0121388 A1* | 7/2003 | Wheeler et al. | 83/699.21 |
| 2003/0121389 A1* | 7/2003 | Wheeler et al. | 83/699.21 |
| 2004/0177512 A1* | 9/2004 | Lin | 30/392 |
| 2004/0187323 A1* | 9/2004 | Hartmann | 30/392 |

FOREIGN PATENT DOCUMENTS

| | | |
|---|---|---|
| DE | 34 46 278 | 8/1987 |
| DE | 88 08 036.6 | 10/1988 |
| DE | 37 17 585 | 6/1992 |
| DE | 34 28 436 | 5/1993 |
| DE | 41 30 174 | 11/1993 |
| DE | 93 18 615 | 3/1994 |
| DE | 93 15 498.4 | 5/1994 |
| DE | 93 20 029.3 | 7/1994 |
| DE | 41 02 011 | 1/1996 |
| DE | 34 28 445 | 4/1996 |
| DE | 295 13 616 | 6/1997 |
| DE | 36 45 344 | 3/1998 |
| DE | 195 36 277 | 3/1998 |
| DE | 198 21 185 | 11/1999 |
| DE | 198 31 222 | 1/2000 |
| DE | 199 32 637 | 1/2000 |
| DE | 100 34 681 | 1/2001 |
| DE | 100 36 171 | 2/2001 |
| EP | 0 072 282 | 2/1983 |
| EP | 0 603 552 | 11/1993 |
| EP | 0 727 270 | 8/1996 |
| EP | 0 561 473 | 1/1998 |
| EP | 0 669 181 | 4/1998 |
| EP | 0 582 326 | 2/1999 |
| EP | 1325790 A2 * | 7/2003 |
| FR | 933 625 | 1/1948 |
| FR | 2 659 045 | 9/1991 |

* cited by examiner

RECIPROCATING SAW

CROSS-REFERENCE TO RELATED APPLICATION

This is a continuation of an application filed Jan. 2, 2002 and assigned U.S. Ser. No. 10/162,535.

FIELD OF THE INVENTION

The present invention relates to reciprocating saws and more particularly to a reciprocating saw arrangement operable to translate rotational movement of a power source into reciprocal linear actuation of a saw blade.

BACKGROUND OF THE INVENTION

Craftsman and builders have used reciprocating saws and jigsaws throughout the industry to perform various cutting operations. A conventional reciprocating saw or jigsaw generally consists of a housing having a motor, a drive mechanism for translating rotational motion of the motor into linear actuation of a carrier or drive shaft, and a saw blade releasably coupled to the drive shaft. Such conventional arrangements however present a few drawbacks which decrease usability and longevity of the tool. For example, during a cutting operation, woodchips or debris from the workpiece tend to collect around the clamping mechanism holding the saw to the tool. Furthermore, in some instances debris can be ingested into the drive mechanism of the saw. It would be desirable to provide a saw that created a positive pressure at the blade, clamping mechanism interface to inhibit debris from collecting in the area or travelling into the drive mechanism.

In addition, conventional reciprocating saws generally include a handle extending at a 180 degree angle while jigsaws have a handle extending at 90 degrees. It would be an advantage to provide a handle greater than 90 and less than 180 degrees to allow for a comfortable grip of the tool for use in both jigsaw and reciprocating saw applications.

Furthermore while conventional drive mechanisms associated with reciprocating saws are satisfactory for their intended purpose, a need exists to provide simpler, more durable alternatives that provide the desired function while advancing the art.

SUMMARY OF THE INVENTION

It is a general object of the present invention to provide a reciprocating saw including a carrier operable to cooperate with a power source to translate rotational movement of the power source into reciprocal linear actuation of a saw blade.

In one form, the present invention provides a reciprocating saw having a housing containing a motor. A carrier is slidably disposed within the housing and includes a first portion adapted to receive a saw blade and a second portion having a slot therethrough. A rotatable element is fixed for rotation about an output shaft of the motor. A follower operably interconnects the carrier and the rotatable element. Rotation of the rotatable element provides reciprocal linear motion of the carrier. The follower follows a reciprocal linear path within the slot.

In another form, the present invention provides a reciprocating saw including a housing containing a motor. The saw further includes a saw blade having a cutting edge, a mounting edge and a side surface, the side surface defining a first plane. A carrier member is included having a first portion including a base defining a second plane, the base is adapted to receive the saw blade wherein the first plane is parallel to the second plane. The carrier includes a second portion in communication with the motor. The second portion includes a slot which defines a guide path. A rotatable element is fixed for rotation about an output shaft which extends from the motor. A follower operably interconnects the carrier and the rotatable element. Rotation of the rotatable element provides reciprocal linear motion of the carrier. The follower follows a reciprocal linear path within the guide path.

In yet another form, the present invention provides a reciprocating saw including a housing containing a motor. A saw blade is included having a shank portion and a cutting portion. The reciprocating saw further includes a carrier having a first portion adapted to receive a saw blade and a second portion in communication with the motor. The first portion includes a pair of lateral walls and a base extending between the walls. A clamp extends from the lateral walls. The clamp engages the saw blade at an interface edge to retain a shank portion of the saw blade within the first portion of the carrier. A cam member extends between the lateral walls. The cam member is positioned away from the base portion forming a gap to receive the blade. The cam member is adjacent a portion of the blade between the interface edge and the cutting portion.

In another form, the present invention provides a reciprocating saw including a housing and a motor. A carrier is slidably disposed within the housing and includes a first portion adapted to receive a saw blade and a second portion adapted to communicate with a motor. A fan is disposed in a handle portion of the housing and configured to force air through the second portion of the carrier. Air flows from the second portion of the carrier to the first portion of the carrier creating a seal to prevent woodchips and debris from entering the tool.

In still another form, the present invention provides a reciprocating saw including a housing and a motor. The housing includes a primary base having a planar surface for interfacing the workpiece. The primary base further includes an aperture providing a passageway for a saw blade. In addition, the primary base includes a first pair of lateral rails extending outwardly from opposite sides of the base. A secondary base is provided including a second pair of lateral rails oriented to slidably engage the first pair of lateral rails for selectively mounting to the primary base. The secondary base provides a greater planar surface area for increased stability during cutting.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
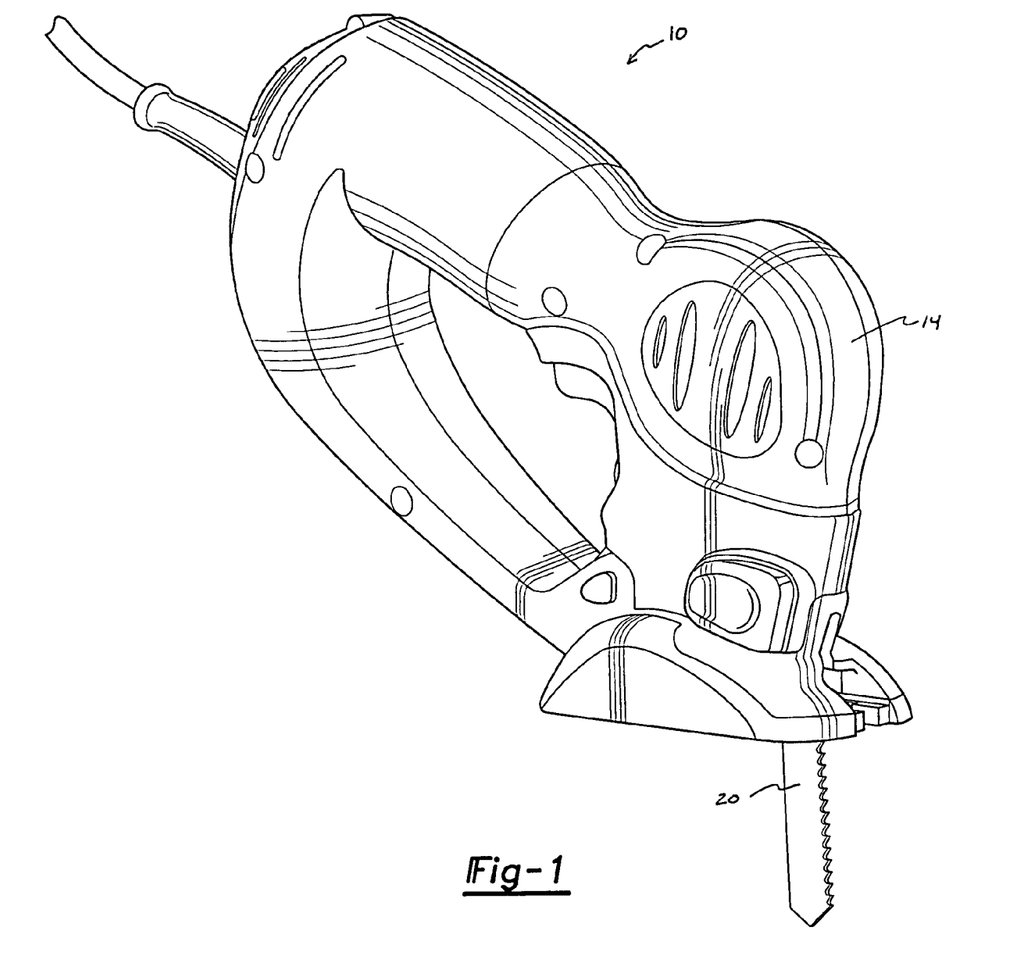
FIG. 1 is a perspective view of the reciprocating saw of the present invention.
Figure 2:
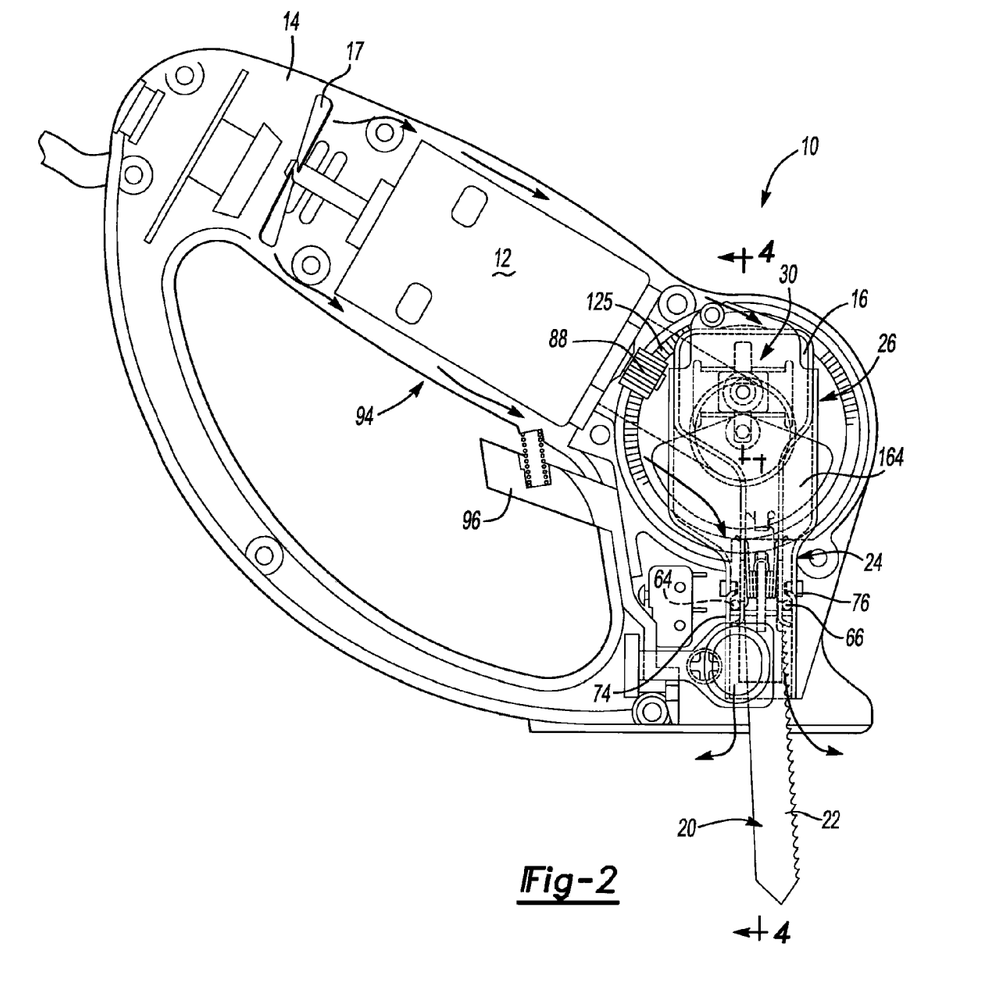
FIG. 2 is a cutaway view of the reciprocating saw.

With initial reference to FIGS. 1 and 2, a reciprocating saw according to the teachings of the present invention is illustrated and generally identified by reference numeral 10. Reciprocating saw 10 includes a motor 12 disposed within a housing 14. Reciprocating saw 10 is configured to actuate saw blade 20. Housing 14 includes a handle 94 extending at an angle greater than 90 degrees with respect to saw blade 20. Handle 94 preferably extends at an angle between 105 and 125 degrees to allow for a comfortable grip for use in jigsaw and reciprocating saw applications.

With continued reference to FIG. 2, and additional reference to FIGS. 3 and 4, the blade retaining mechanism 46 will be described in greater detail. A carrier or shaft 16 actuates a saw blade 20. The carrier 16 is disposed within the housing 14. The carrier 16 has a first portion 24 which receives the saw blade 20, and a second portion 26 which is driven by drive assembly 30. First portion 24 of carrier 16 incorporates the blade retaining mechanism 46. The blade retaining mechanism 46 includes cam system 28 and base 42 as described in copending application "Saw Blade Clamp System" which is hereby incorporated by reference. The cam system 28 includes a rocker arm 32 having a lever end 34, an intermediate pivot portion 36 and a clamp end 38. The intermediate pivot portion 36 is adapted to receive a support shaft 40. The rocker arm 32 rotates about the support shaft 40. The lever end 34 is activated by a push button 108 mounted on the housing 14.

Rocker arm 32 is biased in a clockwise direction (arrow C) such that the clamp end 38 is influenced against the saw blade 20. Spring 44 includes spring ends 48 fixedly attached to a first and second side wall 56, 58 of base 42. An intermediate loop 50 of the spring 44 is adapted to communicate with an upper surface 54 of the rocker arm 32 to provide a biasing force.

First and second side walls 56, 58 extend perpendicularly from floor 60 of base 42 to define channel 62. Side walls 56, 58 are supported on opposite sides by ball bearings 64, 66 disposed on guide platform 164 in housing 14 for slidable movement. Ball bearings 64, 66 are preferably positioned at a location proximate to the rocker arm 32 and blade 20 interface point to reduce torquing on the carrier 16 and blade 20 during operation. The outside cross-section of the carrier 16 is substantially the same along the length of where the blade 20 is retained. This allows ball bearings 64, 66 to roll smoothly along surfaces 56 and 58. Concurrently, ball bearings 64, 66 maintain a proximate relation to the cutting bias forces created during cutting which minimizes bearing load. Guide flanges 84, 86 retain bearings 64, 66 and allow the bearings 64, 66 to be closer to the cutting bias force.

The first and second side walls 56, 58 include first and second spring mounting passages 70, 72. The passages 70, 72 fixedly secure the spring ends 48. Similarly, support shaft 40 is retained through apertures 74, 76 disposed in walls 56, 58, respectively. The ends 80, 82 of first and second side walls 56, 58 are contoured outwardly creating first and second guide flanges 84, 86. A cam member or pin 90 extends between walls 56, 58. The pin 90 provides additional support to blade 20 which discourages blade breakage within the carrier 16 during operation. The guides 84, 86 serve to help direct the blade 20 into the channel 62. The floor 60 of the base 42 includes a stop 92. Stop 92 is oriented at an angle toward the cam system 28.

Referencing now all Figures, the operation of retaining mechanism 46 will now be described. To install blade 20 in the retaining mechanism 46, the blade 20 is inserted into channel 62 until the outer edge 52 of the blade 20 abuts the angled contact surface 68 of stop 92. Accordingly, the body or major side surface 22 of blade 20 is oriented so that the planar surfaces 22 and 60 are in a parallel or in-line relationship. Thus, as the blade 20 cuts through a workpiece, the material width of the carrier 16 as well as the blade 20 are in the line of cut. This increases the blade strength during operation.

Tail section 78 of blade 20 extends between stop 92 and the first side wall 56 to provide the blade 20 with additional stability. Side surface 98 of stop 92 provides a bias against surface of tail section 78 of blade 20. Once the blade 20 is fully inserted, spring 44 biases the clamp end 38 against the aperture wall 18 of the blade 20. The force influences surface 52 against surface 68 of stop 92 to secure the blade 20 to the blade retaining mechanism 46. Stop 92 cams blade 20 down against base 42 which minimizes side to side clearances making the cut more accurate and efficient. To remove the blade 20, a push button 108 on housing 14 is pressed against the lever end 34 of rocker arm 32 to disengage the clamp end 38 from the aperture wall 18 of the blade 20.

The second portion 26 of the carrier 16 includes an outer flange 100 extending from first and second walls 56, 58 around the perimeter of first portion 24. Likewise, base 42 of first portion 24 extends to second portion 26 and is bordered by flange 100. Slot 102 is integrated into base 42. The slot 102 forms an opening through the carrier 16. Slot 102 is defined by a first and second pair of lateral walls 104, 106 extending from opposing edges of the slot 102. Lateral wall sections 104, 106 define a guide path 110. Slot 102 further includes opposing channels 114, 116 formed in base 42 of carrier 16. The channels 114, 116 are formed between first and second pair of lateral wall sections 104, 106. As will be described in detail, opposing channels 114, 116 are configured to accommodate gear support shaft 120. The opposite ends of guide path 110 are defined by grooves 122, 124.

Figure 3:
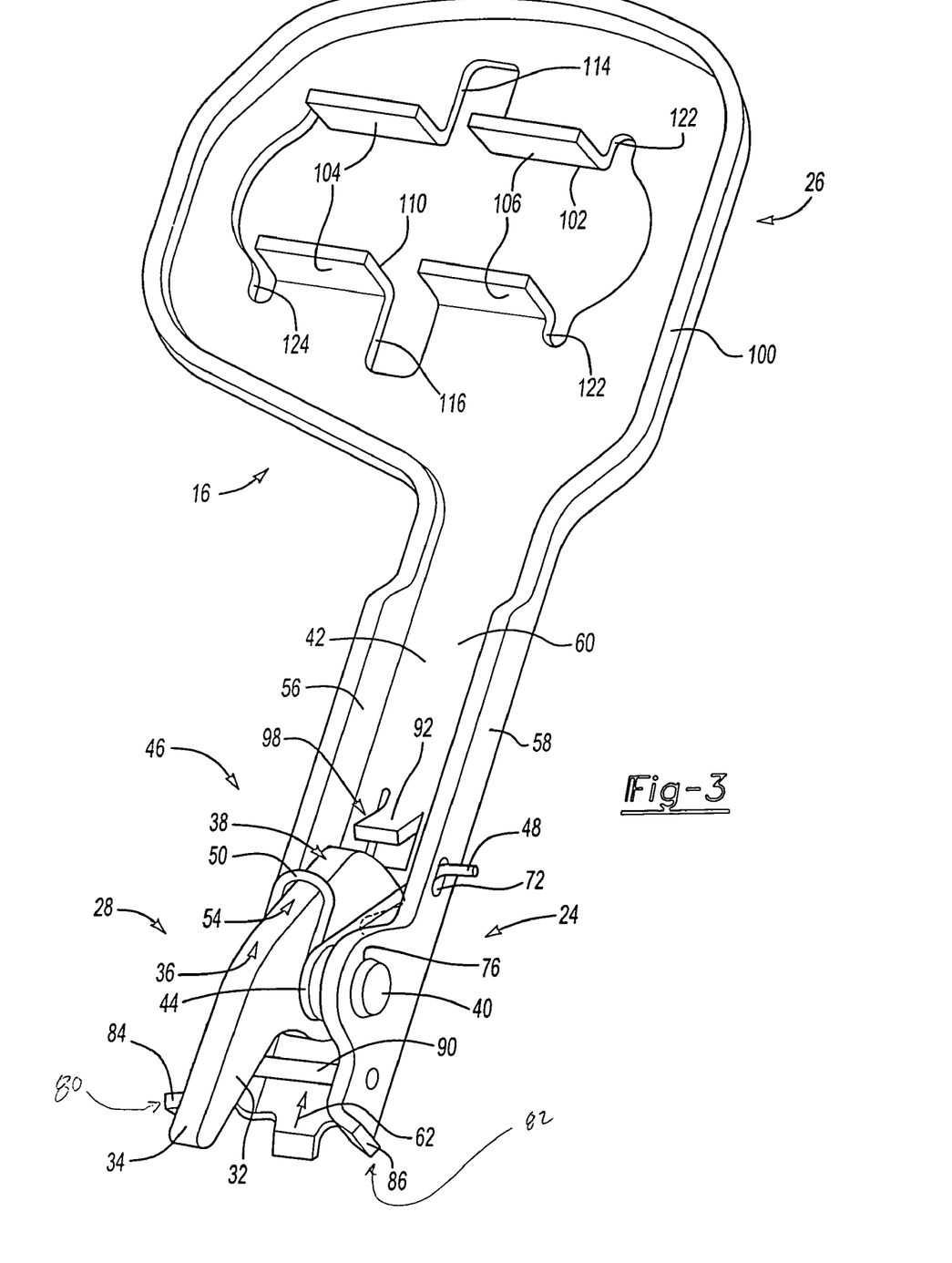
FIG. 3 is a perspective view of the carrier removed from the saw.
Figure 4:
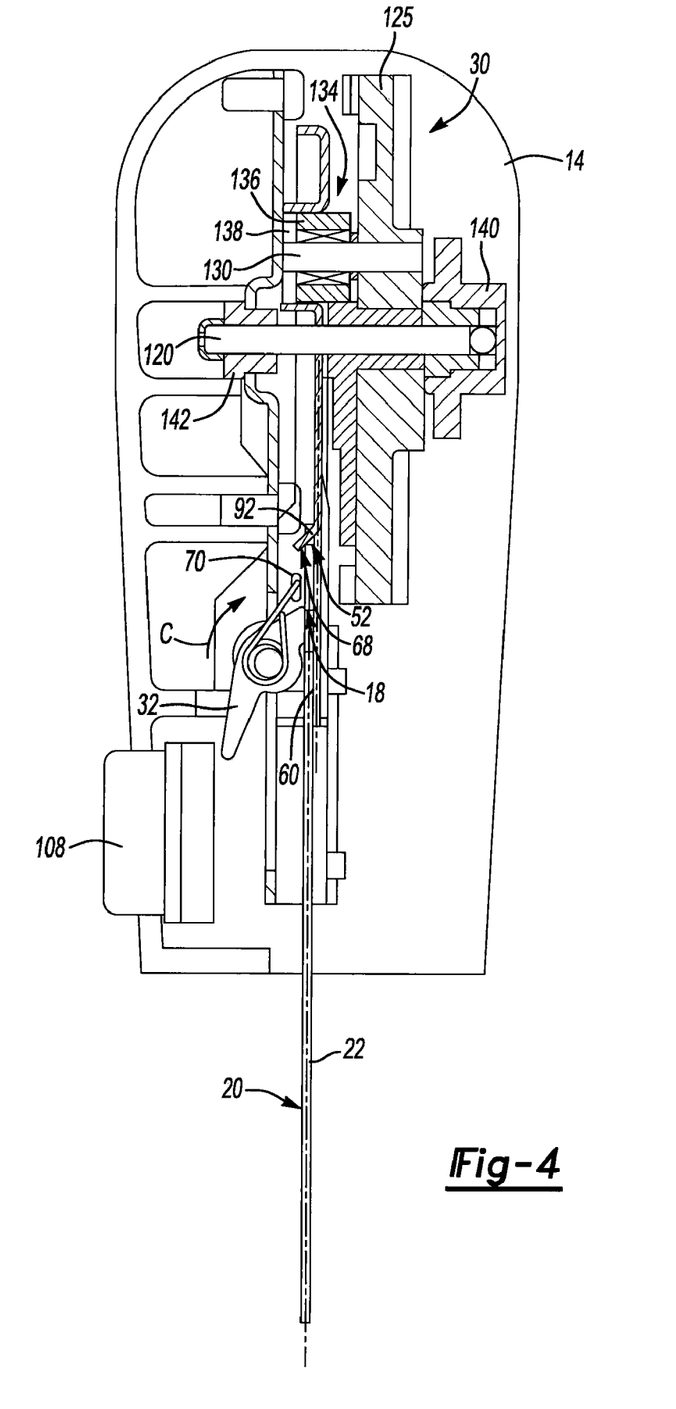
FIG. 4 is a cutaway view of the saw along line 4-4 of FIG. 2.

Turning now to FIGS. 2-4, the drive assembly 30 will be further described. The drive assembly 30 is initiated by actuation of trigger 96 extending from housing 14. Motor 12 includes drive gear 88 which is splined for rotation with output gear 125. Drive assembly 30 includes gear support shaft 120 supported at opposite ends by bearings 140, 142. Gear noise and wear are reduced by supporting shaft 120 at opposite ends. Output gear 125 is disposed on support shaft 120. An offset output shaft 130 is coupled to output gear 124. The output shaft 130 is arranged to orbit drive shaft 130. A follower 134 is rotatably coupled to offset output shaft 130. Follower 134 includes roller 136 and slider 138 which are received within guide path 110 of slot 102. As such, translation of follower 134 along guide path 110 encourages concurrent rotatable engagement of roller 136 and slidable engagement of slider 138 along the face of the corresponding lateral walls 104, 106. The advantage of using follower 134 including roller 136 and slider 138 is that it provides reduced gear noise and wear while providing low output shaft 130 losses.

Figure 5A:
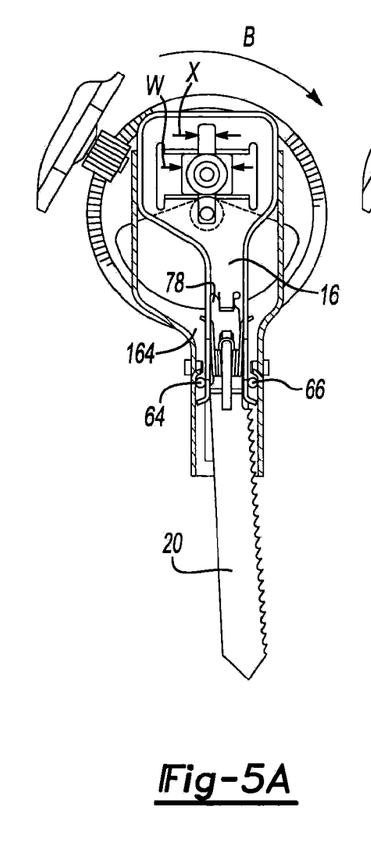
FIGS. 5A-5D is a partial cutaway view of the carrier and drive assembly through one complete rotation of the output gear.
Figure 5B:
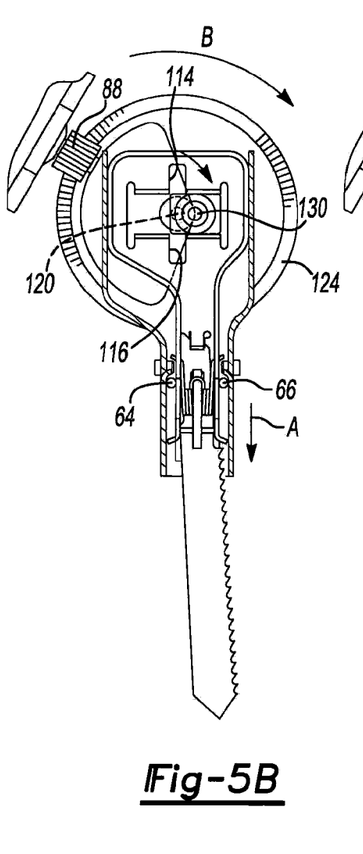
Figure 5C:
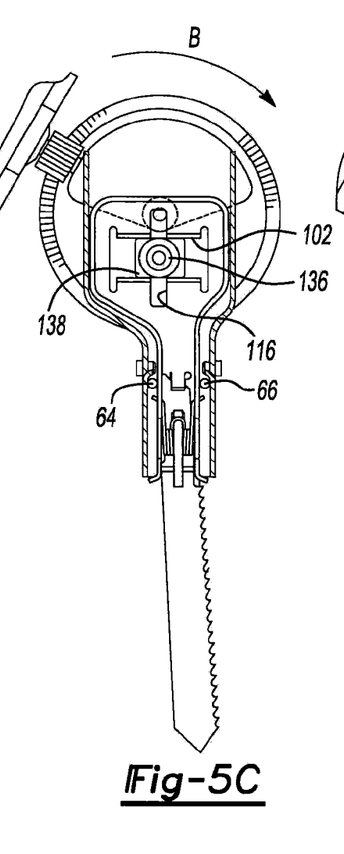
Figure 5D:
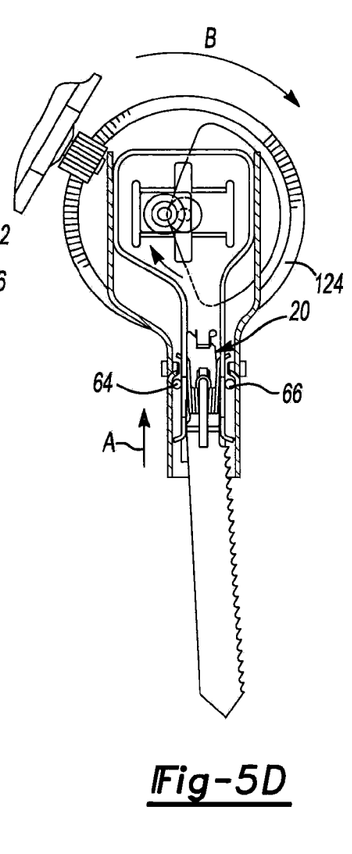

Turning to FIGS. 5A-5D, during operation, carrier 16 makes a generally reciprocal up and down linear motion as designated by arrow "A". FIG. 5A represents the follower 134 in a top dead center position with respect to slot 102. FIG. 5B shows the follower at 90 degrees fully extended in the horizontal position. FIG. 5C represents the follower in a bottom dead center position at 180 degrees. FIG. 5D shows the follower at 270 degrees in a fully extended horizontal position.

The rotational motion of drive gear 88 is transmitted through output gear 124 and associated orbit drive shaft 130 to follower 134. Rotational movement of output gear 124 is designated by arrow "B". Slot 102 within carrier 16 converts the vertical component of the circular path of the orbit drive shaft 130 into up and down linear motion of carrier 16. The horizontal component of the circular path is expended as the orbit drive shaft 130 moves in the direction of guide path 110. The opposing channels 114, 116 integrated on carrier 16 provide a passage to accommodate gear support shaft 120 as the follower 134 transmits through the horizontal component of the circular path (FIGS. 5A and 5C). Accordingly, slider 138 has a width "W", which extends in the direction of guide path 110, a distance greater than the width "X" of channels 114, 116. Such a relationship minimizes momentum loss of the follower 134 while travelling past channels 114, 116 to provide smooth transition in the horizontal direction. In addition, roller 136 increases efficiency of the reciprocating movement of follower 134. This is due to the fact that the majority of the movement is accomplished by the roller 136 rolling on the lateral walls 104, 106.

Returning to FIGS. 2 and 3, the reciprocating saw 10 includes a fan 17 disposed within the handle 94 and oriented to force air around motor 12 to second portion 26 of carrier 16. The fan 17 is arranged to provide cooling to motor 12 and inhibit debris from collecting around cam system 28 and drive assembly 30. A portion of the air escapes the housing 14 through vents 150 incorporated on opposite sides of the housing 14. The remaining airflow is directed from second portion 26 to first portion 24 through channel 62 of carrier 16. The airflow through channel 62 acts as a seal to inhibit woodchips and other debris from settling around retaining mechanism 46. The residual air flowing through channel 62 clears debris away from the blade 20, workpiece interface which improves visibility. The airflow also creates a positive pressure away from second portion 26 of carrier 16 to discourage debris from settling around the drive assembly 30.

Figure 6:
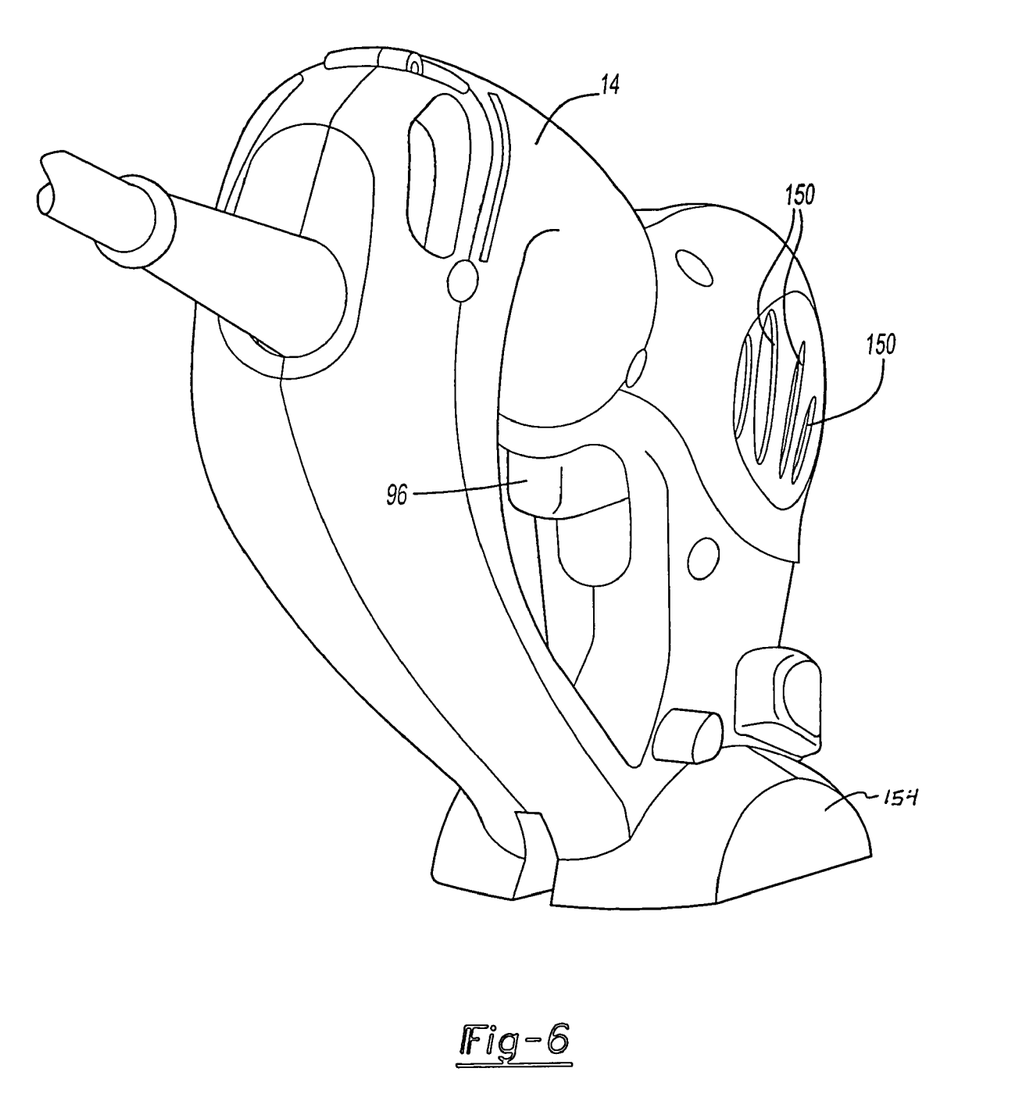
FIG. 6 is a rear perspective view of the reciprocating saw shown with the secondary base attached.
Figure 7:
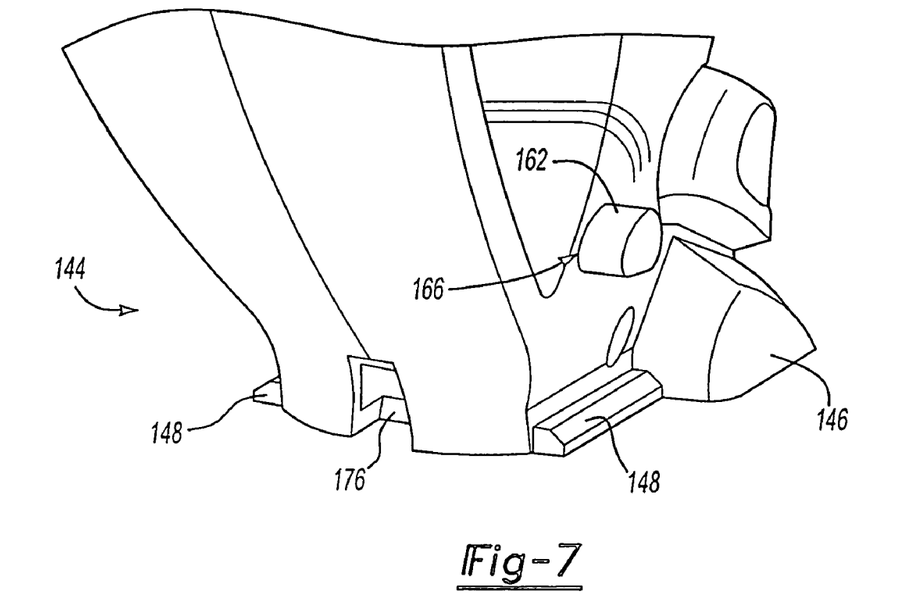
FIG. 7 is a perspective view of the reciprocating saw shown with the secondary base removed to illustrate the rails of the primary base.
Figure 8:
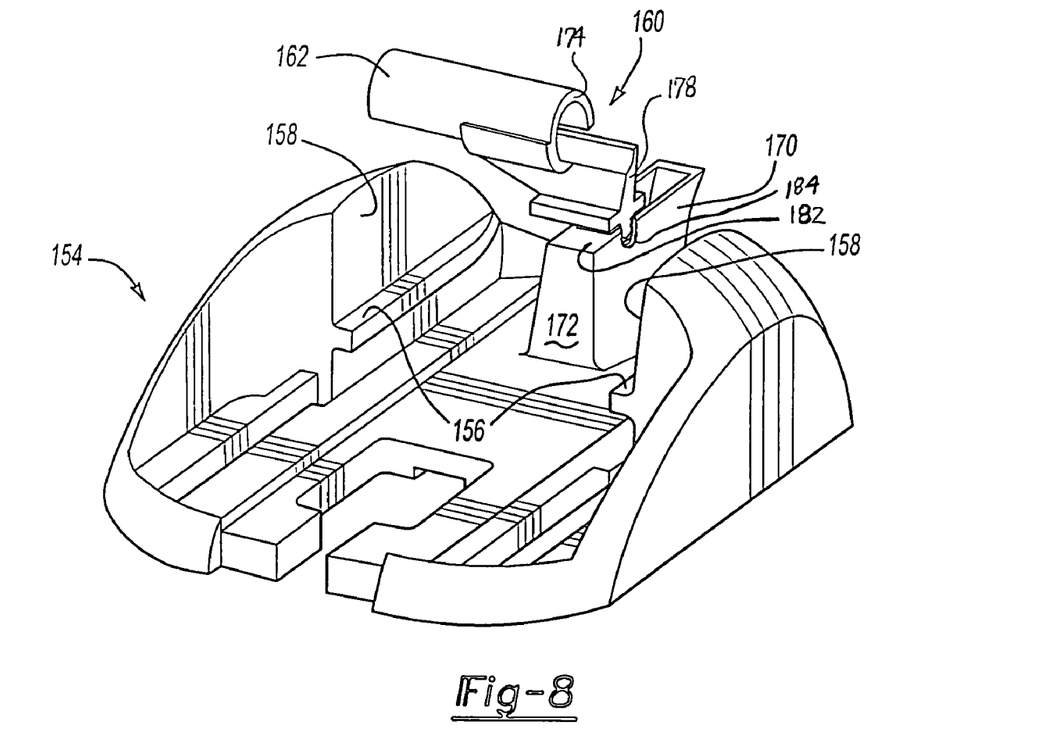
FIG. 8 is a perspective view of the secondary base.

Turning to FIGS. 6-8, the reciprocating saw 10 includes a primary and secondary base 144, 154. Primary base 144 includes heal portions 146 and lateral rails 148 extending from opposite edges to provide stability during operation. Secondary base 154 includes a second pair of lateral rails 156 inwardly extending from outer walls 158. Secondary base 154 is selectively attachable to primary base 144 to provide greater surface area and stability during operation. A latch 160 is mounted to primary base 144 and provided for coupling the secondary base 154 with the primary base 144 in an engaged position. A button 162 of the latch 160 is configured to extend through an opening 166 in the housing 14 to improve accessibility. The latch 160 maintains a static position in the tool assembly by a compression spring (not shown). The spring acts along its axis between sidewall 174 of button 162 on one end and an interior wall (not shown) of primary base 144 on the opposite end which forces the latch 160 into engagement with the contact wall 172 of stop 170.

To install secondary base 154 onto primary base 144, the first pair of rails 148 of the primary base 144 are aligned with the second pair of rails 156 on the secondary base 154. The secondary base 154 is moved forward in a direction parallel to the axis of the rails 156. The button 162 of latch 160 is depressed until wall 172 of stop 170 extending from the secondary base 154 engages wall 176 of the primary base 144. The button 162 of latch 160 is then released causing arm 178 of latch 160 to be received through passage 184 in stop 170. Engagement of arm 178 with lip 182 of stop 170 ensures secondary base 154 is locked into position.

While the invention has been described in the specification and Illustrated in the drawings with reference to a preferred embodiment, it will be understood by those skilled in the art that various changes may be made and equivalents may be substituted for elements thereof without departing from the scope of the invention as defined in the claims. Accordingly, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A reciprocating saw comprising:
a housing containing a motor;
a substantially flat planar monolithic one piece carrier slidably disposed within said housing, said carrier including a first portion with a planar base and side walls extending from and continuous with said planar base defining a channel adapted to receive a saw blade and a second portion, continuous with said first portion forming said one piece carrier, said second portion having a slot with lateral side walls extending from opposing edges of said slot in said flat second portion forming an opening through said carrier, said lateral walls include a first pair and a second pair of laterally opposed walls, said first pair of walls laterally offset from said second pair of walls by a first channel and a second channel formed in said carrier, said carrier positioned in said housing such that the plane of said planar base is in a line of cutting with the saw blade so that the plane of the line of cut is substantially parallel to the plane of the planar base;
a rotatable element fixed for rotation about a support and rotated by said motor; and
a follower for operably interconnecting said carrier and said rotatable element, said follower rolling on said lateral walls wherein rotation of said rotatable element provides reciprocal linear motion of said carrier whereby said follower follows a reciprocal linear path within said lateral walls.

2. The reciprocating saw of claim 1, wherein said channels are oriented whereby said support extends therethrough as said follower follows said reciprocal linear path within said slot.

3. The reciprocating saw of claim 2, wherein said follower includes a slider laterally extending in a first direction a width so as to slidably interfit between said first and second laterally opposed walls and in a second direction a width greater than said channels.

4. The reciprocating saw of claim 3, wherein said follower further includes a roller coupled to said slider, said roller configured to rotatably interface said lateral walls as said follower follows said reciprocal linear path within said slot.

5. The reciprocating saw of claim 4, wherein said housing further includes a fan operable to direct air through said second portion of said carrier to said first portion of said carrier.

6. The reciprocating saw of claim 5, wherein said fan further directs air out of said housing through vents incorporated therein.

7. The reciprocating saw of claim 1, wherein said reciprocating saw further includes a releasably attached base portion, said base portion including a first pair of lateral rails extending therefrom for slidably engaging a second pair of lateral walls incorporated on said housing.

8. The reciprocating saw of claim 7, wherein one of said housing and said base portion further includes a latch for selectively coupling said base portion to said housing.

9. A reciprocating saw comprising:
   a housing containing a motor; a saw blade having a cutting edge, a mounting edge and a side surface, said side surface defining a first plane in a line of cut with said cutting edge;
   a monolithic one piece carrier member having a first portion defining a channel adapted to receive said saw blade, said channel including a base defining a second plane and walls extending from and continuous with said base and substantially perpendicular to said second plane, wherein said first plane is parallel to said second plane and said first plane resting on said second plane, and a second portion, continuous with said first portion forming said one piece carrier, said second portion having a slot with lateral side walls extending from opposing edges of said slot in said flat second portion forming an opening through said carrier member defining a guide path;
   said second portion lateral wall sections include a first pair and a second pair of laterally opposed walls, said first pair of walls laterally offset from said second pair of walls by a first channel and a second channel formed in said carrier member;
   a rotatable element rotated by an output shaft extending from said motor;
   a follower for operably interconnecting said second portion and said rotatable element, said follower rolling on said lateral walls wherein rotation of said rotatable element provides reciprocal linear motion of said carrier member whereby said follower follows a reciprocal linear pattern within said guide path.

10. The reciprocating saw of claim 9, wherein said channels are oriented whereby said output shaft extends therethrough as said follower follows said reciprocal linear pattern within said slot.

11. The reciprocating saw of claim 9, wherein said follower includes a slider coupled thereto, said slider laterally extending in a first direction defining a width so as to slidably interfit between said first and second laterally opposed walls and in a second direction a width greater than said channels.

12. The reciprocating saw of claim 11, wherein said follower further includes a roller coupled to said slider, said roller configured to rotatably interface said laterally opposed walls as said follower follows said reciprocal linear pattern within said guide path.

13. The reciprocating saw of claim 9, wherein said housing further includes a fan operable to direct air through said second portion of said carrier member to said first portion of said carrier member.

14. The reciprocating saw of claim 13, whereby said fan further directs air out of said housing through vents incorporated therein.

15. The reciprocating saw of claim 9, wherein said reciprocating saw further includes a removable base, said removable base including a first pair of lateral rails extending therefrom for slidably engaging a second pair of lateral walls incorporated on said housing.

16. The reciprocating saw of claim 15, wherein one of said housing and said removable base further includes a latch for selectively coupling said removable base to said housing.

* * * * *